Dec. 16, 1941.  H. COHEN  2,266,166
CUTTING MACHINE
Filed April 15, 1940  2 Sheets-Sheet 2

INVENTOR
Harry Cohen
BY Frank Kahn
ATTORNEY

Patented Dec. 16, 1941

2,266,166

UNITED STATES PATENT OFFICE 2,266,166

CUTTING MACHINE

Harry Cohen, Bronx, N. Y.

Application April 15, 1940, Serial No. 329,764

16 Claims. (Cl. 30—274)

My invention relates to cloth cutting machines, and, more particularly, relates to a cutting machine having an endless chain of cutting blades.

Cloth cutting machines in present use are either of the round knife or straight knife type. The round knife cutter has the great advantage that it is easily kept sharp with a very simple and efficient automatic sharpener. Its major shortcomings are that the depth of fabric is limited to the radius of the blade, it cannot be used to cut a sharp corner or to stop a cut at the same point on all the layers of cloth, and it is inaccurate on turns and difficult to use on stiff fabrics where turns or corners are indicated. The straight knife cutter makes excellent curves and sharp corners and has an excellent depth of cut. Its major faults are that the cutting edge, being relatively considerably shorter than in the round knife cutter, requires more frequent sharpening, it is not adaptable to simple efficient automatic sharpening, and it must be used with a presser foot which ruffles the material, especially on turns or corners. Also, cutting machines are heavy and require considerable manual effort to push them through starched fabrics or thick piles of material, making the cutting operation very laborious.

The primary object of my invention is to provide a cutting machine having the advantages of both the round knife and straight knife cutters without their disadvantages.

A further object of my invention is to provide a straight edge cutter having a continuously moving endless blade.

Another object of my invention is to produce a cutter of simple and efficient design having readily replaceable inexpensive cutting blades.

Still a further object of my invention is to provide a self-propelled cutter whose speed is manually controlled by the operator.

With these and other objects in view which will become apparent as the description proceeds, my invention consists essentially of a motor-driven endless chain of cutting blades suitably encased with its associated mechanism to present to the layers of material to be cut, a continuously moving vertical cutting edge, and including means to propel the complete device manually or automatically at controlled speed.

Figure 1:
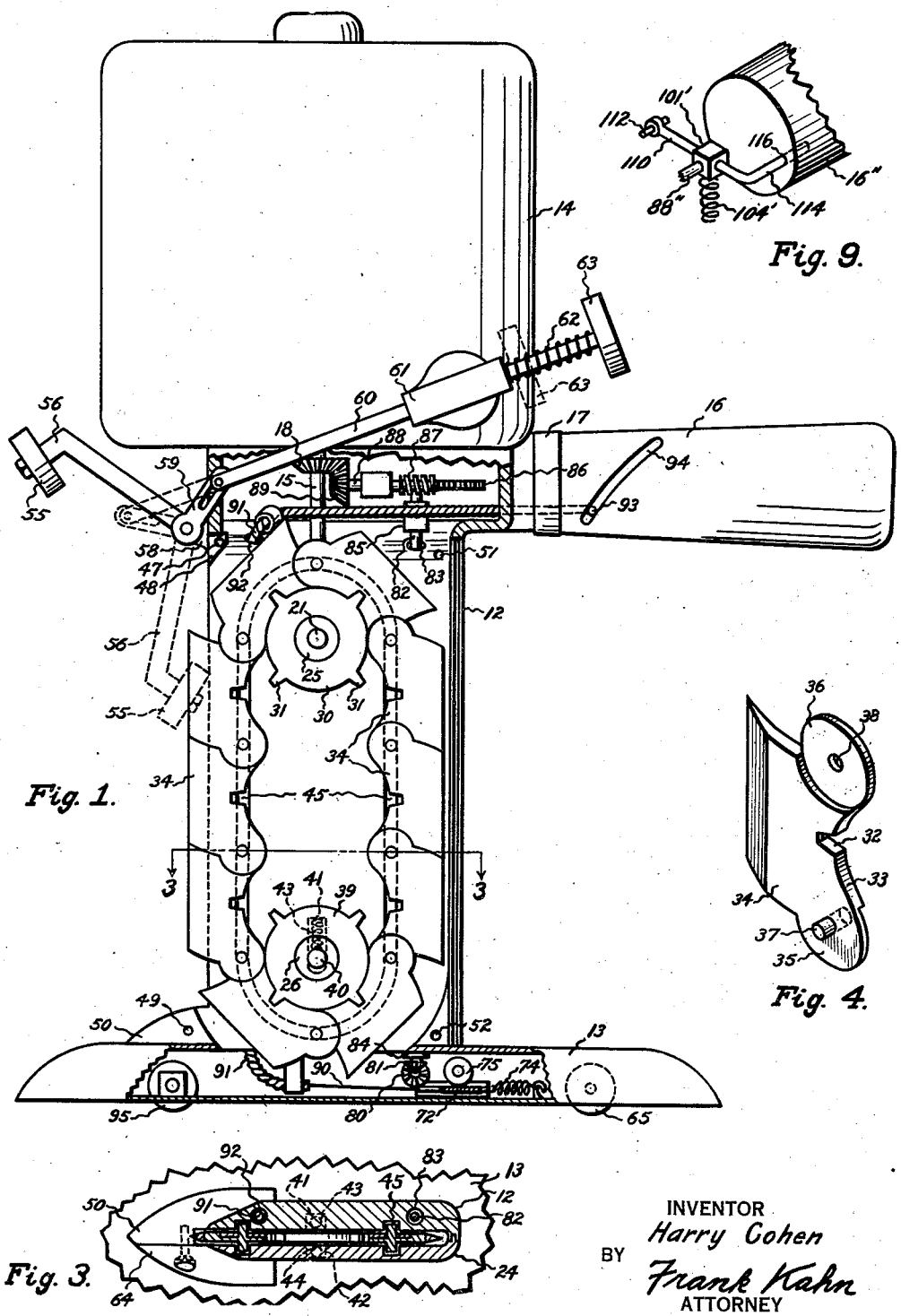
Figure 2:
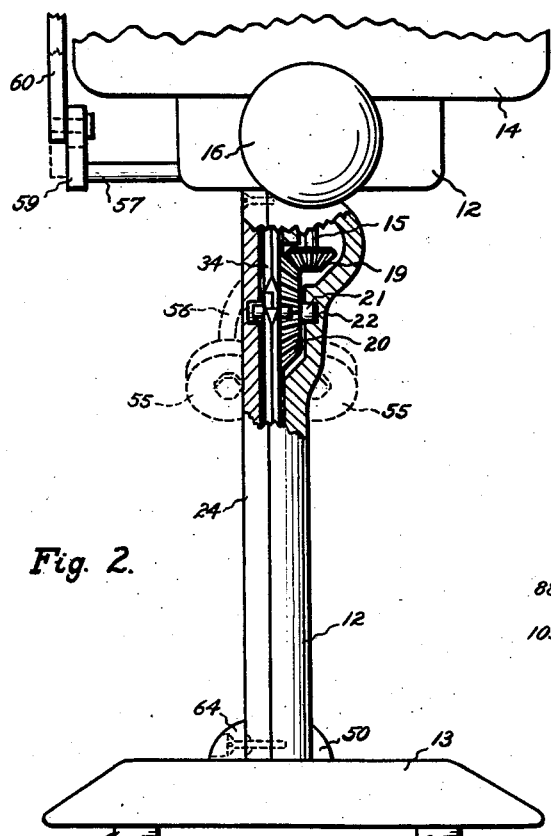
Figure 5:
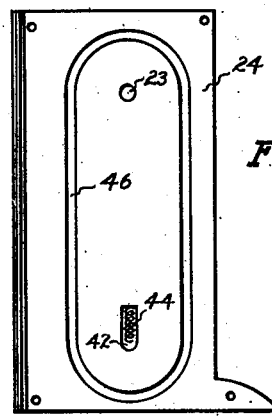
Figure 8:
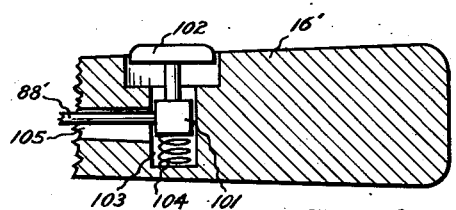
Figure 6:
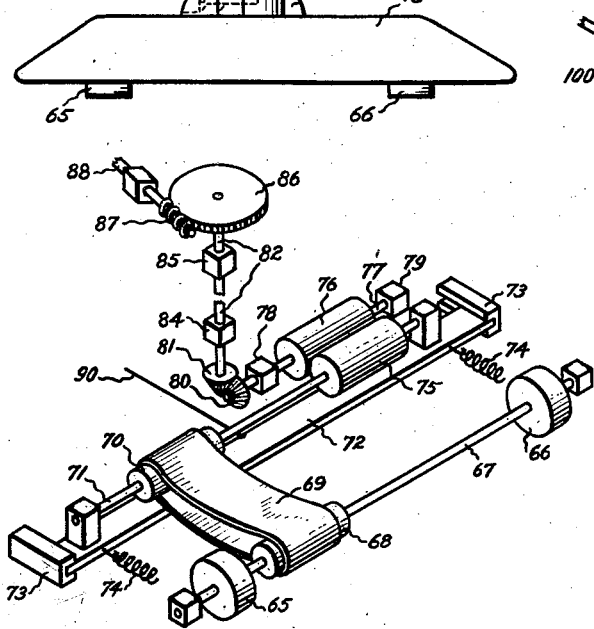
Figure 7:
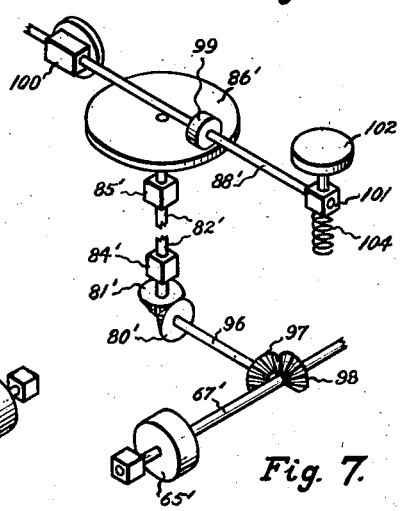

The invention, both as to details of construction and combination of parts, will best be understood from the following description of a specific embodiment which I illustrate as an example, when read in connection with the accompanying drawings, in which:

Figure 1 is a side elevational view, partly in section, of my cutting machine with cover plate removed; Fig. 2, a fragmentary rear elevational view, partly in section, of the device of Figure 1; Fig. 3, a fragmentary plan section on the line 3—3 of Figure 1, with the cover plate in place; Fig. 4, a perspective view of one of my cutting blades; Fig. 5, an elevational view of the inner side of the cover plate; Fig. 6, a diagrammatic view of part of the propelling mechanism showing the method of speed control of the device of Figure 1; Fig. 7, a diagrammatic view of a modification of the propelling and control mechanism of the device of Figure 6; Fig. 8, a fragmentary vertical section of the handle of the modification of Figure 7 showing the details of the manual control; and Fig. 9, a fragmentary diagram of an alternative method for control of the device of Figure 7.

Referring now to the drawings, I have shown in Fig. 1 a cutter comprising a supporting housing 12 mounted on a base 13 and carrying at its top an electric motor 14 with its shaft 15 in vertical position. A horizontal control handle 16 axially rotatable in an attaching ferrule 17 projects rearwardly from the top of the housing 12. The motor shaft 15 extends downwardly into the housing 12 and carries two bevel pinions 18 and 19. Pinion 19 is at the end of shaft 15 and engages a gear 20 which carries a concentric ball bearing 25 of conventional type which permits the gear to rotate freely on a horizontal shaft 21 journaled at one end in a bearing 22 in housing 12 and at the other in a bearing 23 in the cover plate 24 shown in Fig. 5.

A driving sprocket wheel 30 integral with gear 20 is provided with four teeth 31, 31 which are adapted to engage a notch 32 in the rear edge 33 of the cutting blades 34, 34.

The blades 34 are interchangeable and are provided at the ends with circular ears or flanges 35 and 36 cut down from opposite faces to half the thickness of the blade so that the flanges of adjacent blades may lap each other to form plane surfaces. Each of the leading flanges 35 carries an integral axial pin 37 and the follower flange 36 an axial opening 38 forming a sliding fit with pin 37 so that a suitable number of blades may be fitted together to form an endless chain knife with the pins 37 extending outwardly on either side. A driven or idler sprocket wheel 39, similar to wheel 30 and having a ball bearing 26, is rotatably mounted at the lower part of the housing 12 on a shaft 40. Shaft 40 has one bearing 41 in housing 12 and the other bearing 42 in the cover plate 24. The opening in housing 12 comprising bearing 41 is slotted vertically to house a stiff spring 43 which is placed above and presses downwardly upon shaft 40 to take up any lost motion or play in the chain of blades, the shaft 40 normally floating in slot 41. Similarly, a spring 44 is housed in the vertical slot in the cover plate 24 comprising bearing 42, the spring 44 being shown in extended position in Fig. 5.

The shape of the rear edges of the blades 34 is such that the complete chain will fit snugly in place on wheels 30 and 39, the ends of pins 37 lying in a suitable groove 45 in housing 12 and a corresponding groove 46 in cover plate 24 to hold the blades firmly when the cutter is pushed into the material being cut. The grooves 45 and 46 are widened slightly in the region of the lower curve to permit the springs 43 and 44 to take up the lost motion in the chain of blades. As viewed in Fig. 1, rotation of the chain of blades is counterclockwise. Although the knife consisting of the chain of blades would operate satisfactorily if the trailing ends of blades 34 were defined by the perpendicular to the cutting edge intersecting the axis of the opening 38, the vertical cutting action can be continued closer to the base if the trailing ends of the blades extend rearwardly beyond that point, as illustrated. This follows because the trailing ends sweep outward as the blades revolve about wheel 39, with a resultant increased accuracy of cutting of the bottom layers of fabrics.

The cover plate 24 is drilled at the corners for attachment by machine screws to the housing 12 which is suitably tapped at the points 47, 49, 51 and 52. Cover 24 has a tongue and groove fit to housing 12 at the rear of the cutter, a blade opening being provided by a suitable recess in the front edge of the housing 12 between the boss 48 and the throat plate 50 in which are respectively the tapped openings 47 and 49. The front edge of the cover plate acts as a guide for the blades and must be set fairly tight to the blades to minimize side play. With the cover plate removed as illustrated in Fig. 1, the blades 34 are readily removable for replacement or other servicing.

My cutter is equipped with the conventional round-knife automatic sharpener in which a pair of stone wheels are brought into angular drive relation with the knife edge of the moving blade. In Figs. 1 and 2 the stones 55 are rotatably mounted adjacent one another on a bifurcated crank arm 56 fixed to a crank shaft 57 journaled in a bearing 58 on housing 12 and turned by a crank lever 59. Lever 59 is operated through a sliding pin and slot linkage by a push rod 60 carried in a guide 61 and held in retracted position with the stones 55 held up out of the way of the work, by a spring 62 as shown in the solid lines. When the head 63 of the push rod 60 is depressed by the operator, the lever 59 is pushed forward turning shaft 57 and arm 56 into the position shown by the dotted lines so that the grinding wheels 55 engage the cutting edge of each of the blades 34 at the proper angle for sharpening.

The motor 14 is of the conventional type and is provided with the usual electricity supply cord and control switch (not illustrated). Operation of the motor turns the driving wheel 30 counterclockwise, through pinion 19 and gear 20, moving the straight front edge of the chain knife 34, 34 continuously downward. The throat plates 50 and 64, integral with the housing 12 and cover 24 respectively, serve to force the cloth or other fabric up toward the vertical front part of the knife to assure a straight cut through the pile of material, in a manner similar to action of the usual throat plate in the round knife cutter.

The propelling mechanism includes the rear driving rollers 65 and 66 and a belt pulley 68 integral with a shaft 67 journaled in suitable bearings in the base 13. A belt 69 connects pulley 68 with a pulley 70 fixed on a shaft 71 rotatably mounted in bearings carried on a support 72 arranged to slide in a forward direction in end guides 73, 73 against the tension of springs 74, 74. Fixed to shaft 71 is a friction roller 75 which, when support 72 is pulled forward sufficiently, engages a similar roller 76 mounted on a shaft 77 rotatable in fixed bearings 78 and 79. At one end of shaft 77 is mounted a bevel gear 80 which engages another bevel gear 81 fixed to a shaft 82 which extends vertically up through a suitable aperture 83 in the narrow part into the expanded upper part of the housing 12. Shaft 82 is suitably journaled in bearings 84 and 85 and carries a gear 86 at its upper end which is engaged by a worm 87 on a suitably journaled rotatable shaft 88 driven from pinion 18 through a similar bevel pinion 89. The front part of the cutting machine rolls on idling rollers 95.

The support 72 is pulled forward by a flexible wire 90 borne in a helical flexible metal sleeve 91 which is suitably supported and is carried to the handle 16 through an opening 92 in the narrow vertical part of housing 12. The wire 90 enters the handle 16 through a suitable annular slot and terminates at a pin 93 which projects radially outward into a helical slot 94 in the surface of the handle 16. The metal sleeve 91 terminates within the annular slot and is stiff enough to constrain movement of pin 93 longitudinally to the handle.

Counterclockwise rotation of the handle 16 as viewed in Fig. 2 pulls wire 90 against the tension of springs 74, forcing rollers 75 and 76 into frictional engagement and tightening belt 69 to drive rollers 65 and 66. Speed is controlled by the degree of torque exerted on handle 16.

A modification of my propelling mechanism is shown in Figs. 7 and 8 where the driving roller 65' with its rotatable shaft 67' is driven from the vertical shaft 82' by a cross shaft 96 through bevel gears 80', 81', 97 and 98. The shaft 82' carries at its top end a friction disc 86' which is engaged under the control of the operator by a friction roller 99 attached to a shaft 88'. The shaft 88' is driven from a bevel pinion (not illustrated) which engages pinion 18 in like manner to the drive of shaft 88 from pinion 89. The shaft 88' is journaled in a bearing 100 mounted to rotate in the vertical plane through a small angle without disengagement of the driven pinion from the driving pinion 18. The other end of shaft 88' is journaled in a bearing 101 integral with a depressible member or push button 102 and movable vertically in a well 103 in the handle 16' against a spring 104 positioned in the well 103. The well 103 in handle 16' is counterbored so that the button 102 can be depressed below the handle surface. A suitable slot 105 in the interior of the handle 16' permits the necessary vertical movement of the shaft 88' within the handle.

The shaft 88' and roller 99 are normally in rotation while the motor is running. When the button 102 is depressed, roller 99 is forced into engagement with the disk 86' causing it to revolve, rotating shafts 82', 96, and 67', thus propelling the machine in a forward direction. The degree of pressure on the button 102 will control the speed of forward movement of the cutter.

The speed control mechanism of the modification of Figs. 7 and 8 can be operated by a twisting movement of the handle as well as by pressure on a depressible member. This is illustrated diagrammatically in Fig. 9 which shows a shaft 88" journaled in a vertically translatable bearing 101' biased upwardly by a spring 104', similarly to the construction shown in Fig. 7. The bearing 101' is mounted on an arm 110 transverse to and pivoted at a point 112 to one side of shaft 88". A continuation of the arm 110 beyond the bearing 101' carries a perpendicular extension 114 parallel to the shaft 88". The extension 114 projects into the inner end of the handle 16" at a point 116 near the periphery, the handle 16" being circular in section and mounted for rotation on an axis aligned with the shaft 88". Clockwise rotation of the handle 16" causes shaft 88" to be depressed, communicating the drive to the rear rollers in the manner illustrated in Fig. 7.

It should be understood that for smooth cutting it is very important to have the knife edge continuous as is the case in the round knife cutter. The knife of my invention has this continuous cutting edge for practically all of its useful travel and should not be confused with chain knives in which the blades have been spaced apart during cutting action, and which have proved impracticable because of the chopping action which resulted from the presence of the spaces between the blades.

In place of the flanges 35 and 36 being respectively flush with opposite faces of the blade 34, these flanges may be flush with either face, the adjacent blades then having the flanges flush with the other face. In such case spare blades of both types would be required for replacement of worn blades. It is immaterial whether pin 37 is integral with flange 35 or flange 36 and it may even be a loose pin.

In place of the depressible speed control member 102 being a push button as illustrated, it may have any shape and may be arranged for operation by the thumb, fingers or palm of the operator.

It is intended that my cutting machine be provided with the conventional knife guard in general use with round knife cutters to prevent injury to persons or objects which might inadvertently come into contact with the portion of the knife above the pile of material being cut. The guard, as is well known in the art, comprises a metal bar mounted in front of the cutting edge, secured above the knife, and adjustable for various depths of material to be cut.

Although the invention has been described in considerable detail, such description is intended as illustrative rather than limiting, as numerous embodiments will be apparent to those skilled in the art. My invention, therefore, is not to be limited except insofar as is necessitated by the prior art or by the spirit of the appended claims.

I claim:

1. In a portable motor-operated machine for cutting fabrics, having a base provided with front and rear rollers, means for driving the rear rollers from the motor at variable speed and manually operable means for rendering said first-named means effective to drive said rear rollers and to adjust their speed of rotation, whereby the operator may selectively propel the machine manually or operate it under power drive at the desired speed.

2. In a portable motor-driven cutting machine having a base provided with a plurality of rollers, variable speed power transmission means for driving certain of said rollers from the motor, a rotatable handle, and means controlled by rotation of said handle for rendering said first-named means effective to rotate the driven rollers and to control their speed of rotation, whereby the operator may selectively propel the machine manually or operate it under controlled-speed automatic drive.

3. In a portable motor-operated cutting machine having a handle and a base provided with a plurality of rollers, variable speed power transmission means for driving certain of said rollers from said motor, a resiliently mounted depressible member in said handle, and means controlled by pressure on said member for rendering said first-named means effective to drive the driven rollers and to control their speed of rotation, whereby the operator may selectively propel the machine manually or operate it under controlled speed automatic drive.

4. A cutting machine knife comprising a series of blades pivotally connected together to form a revoluble endless chain, each blade having an outer straight cutting edge and having blade ends and pivotal connections constructed and arranged to cooperatively fit with adjacent blades for alignment of cutting edges to form a straight knife edge, said blades being flat and each provided with a leading and a trailing end flange of reduced thickness, the flanges of adjacent blades lapping to produce plane orbital surfaces, and said pivotal connections comprising a transverse pin in one flange and a transverse opening in the other flange of each blade, the pin in one blade cooperating with the opening in the adjacent blade for articulation in the orbital plane.

5. In a fabric cutting machine having a base and a top mounted motor, a narrow vertical housing having a side cover plate and disposed edge frontward on said base and supporting said motor, said front edge being straight and having a vertical slot therein, a knife comprising a series of blades pivotally connected together by transverse pins protruding outwardly from both sides of said knife to form a revoluble endless chain, each blade having an outer straight cutting edge and being shaped to cooperatively fit with adjacent blades for alignment of cutting edges to form a straight knife edge, means to support said knife within the housing and to guide the blades with the cutting edges protruding from said slot and in alignment parallel to said front edge for part of the revolution of said knife, said means including said housing and said cover which have parallel inner surfaces between which the knife revolves, each of said surfaces being slotted internally to engage said pins with a sliding fit, the internal slots being shaped to constrain revolution of the knife in the desired orbit and to provide support for resisting pressure when the machine is pressed against the fabric and the front edge slot providing transverse alignment of the protruding portion of the knife whereby to insure the equivalent of a rigid knife, and power transmission means to drive said knife from said motor.

6. In a portable motor-operated machine for cutting fabrics, having a base provided with front and rear rollers, means for driving the rear rollers from the motor at variable speed and means for rendering said first-named means effective to drive said rear rollers and to control their speed of rotation, said first-named means comprising a mechanical transmission including two cooperating frictional members, one of said members being movable transversely to its axis of rotation into and out of engagement with said other member and spring-biased out of engagement therewith, and said second-named means comprising a manually operable mechanism for moving said movable member into engagement with the other member against the force of the spring and for controlling the pressure between said members.

7. In a portable motor-operated machine for cutting fabrics, having a base provided with front and rear rollers, means for driving the rear rollers from the motor at variable speed and means for rendering said first-named means effective to drive said rear rollers and to control their speed of rotation, said first-named means comprising a mechanical transmission including a reducing gear train, a driving friction roller, a cooperating driven friction roller, a mounting for said driven friction roller movable to selectively contact or separate said friction rollers and spring biased to separate them, and a belt drive transmitting rotation from said driven friction roller to said rear rollers, and said second-named means comprising a rotatable handle having a helically slotted periphery, a pin engaging the slot and arranged for movement parallel to the axis of the handle when said handle is turned, and a flexible pull wire connecting said mounting and said pin, said wire being guided so that movement of said pin is transmitted to said mounting against the action of the spring.

8. In a portable motor-operated machine for cutting fabrics, having a base provided with front and rear rollers, means for driving the rear rollers from the motor at variable speed and means for rendering said first-named means effective to drive said rear rollers and to control their speed of rotation, said first-named means comprising a mechanical transmission including a shaft mounting said rear rollers, a rotatable friction disk, a gear train communicating the rotation of said disk to said shaft, a friction wheel, and a rotatable drive shaft carrying said wheel and geared to said motor, said drive shaft being pivotally journaled and so disposed that said wheel is movable into and out of engagement with said disk while being rotated by the motor and being spring biased to hold the wheel in disengaged position, and said second-named means comprising a manually depressible member for moving said drive shaft against the spring bias.

9. In a machine of the class described, a series of cutting blades pivotally connected together to form a revoluble endless chain knife, each blade having an outer straight cutting edge and being shaped to cooperatively fit with adjacent blades for alignment of cutting edges to form a straight knife edge, means to guide the blades during revolution of the knife whereby a successive plurality of blades are constrained with cutting edges in alignment for movement parallel with said alignment, means for propelling the machine automatically at various speeds, and manually operable means for rendering said propelling means effective to propel the machine and to adjust the speed at which it is propelled, whereby the operator may selectively propel the machine manually or operate it under automatic drive at the desired speed.

10. A cutting machine knife comprising a series of blades pivotally connected together to form a revoluble endless chain, each blade having an outer straight cutting edge and having blade ends and pivotal connections constructed and arranged to cooperatively fit with adjacent blades for alignment of cutting edges to form a straight knife edge, said blades being flat and each provided with a leading and a trailing end flange of reduced thickness, the flanges of adjacent blades lapping to produce plane orbital surfaces, and said pivotal connections comprising registering transverse openings in the lapping flanges and separable pins fitting transversely into said registering openings, whereby adjacent blades pivot on the connecting pin for articulation in the orbital plane.

11. In a portable motor-operated machine for cutting fabrics, means for propelling the machine automatically at various speeds and manually operable means for rendering said propelling means effective to propel the machine and to adjust the speed at which it is propelled automatically, whereby the operator may selectively propel the machine manually or operate it under automatic drive at the desired speed.

12. In a portable motor-operated cutting machine having a base provided with rollers, means for driving said rollers from the motor at variable speed and manually operable means for rendering said first-named means effective to drive said rollers and to control their speed of rotation, whereby the operator may selectively propel the machine manually or operate it under power drive at the desired speed.

13. In a portable motor-operated cutting machine having a base provided with rollers, means for driving certain of said rollers from the motor at variable speed and manually operable means for rendering said first-named means effective to drive said certain rollers and to control their speed of rotation, whereby the operator may selectively propel the machine manually or operate it under power drive at the desired speed.

14. In a machine of the class described, a series of cutting blades pivotally connected together to form a revoluble endless chain knife, each blade having an outer straight cutting edge and being shaped to cooperatively fit with adjacent blades for alignment of cutting edges to form a straight knife edge, means to guide the blades during revolution of the knife whereby a successive plurality of blades are constrained with cutting edges in alignment for movement parallel with said alignment, said knife being articulated by means of transverse pins connecting said blades for relative rotation about the axes of said pins, said pins protruding outwardly from both sides of said knife, and the blade guiding means including two housing members having parallel surfaces between which said knife revolves, each of said surfaces being slotted to engage said pins with a sliding fit, the slots being shaped to constrain revolution of the knife in the desired orbit.

15. In a fabric cutting machine having a base and a top mounted motor, a narrow vertical housing disposed edge frontward on said base and supporting said motor, said front edge being straight and having a vertical slot therein, a knife comprising a series of blades pivotally connected together to form a revoluble endless chain, each blade having an outer straight cutting edge and being shaped to cooperatively fit with adjacent blades for alignment of cutting edges to form a straight knife edge, means to support said knife within the housing and to guide the blades with the cutting edges protruding from said slot and in alignment parallel to said front edge for part of the revolution of said knife, the blade chain revolving in a plane orbit over a driving sprocket wheel and an idler sprocket wheel, the rear edge of each of said blades being shaped so as to smoothly engage said wheels and said idler wheel being spring biased away from said driving wheel whereby to take up the lost motion in said chain, and power transmission means to drive said knife from said motor.

16. A cutting machine knife comprising a series of blades pivotally connected together to form a revoluble endless chain, each blade having an outer straight cutting edge and having blade ends and pivotal connections constructed and arranged to cooperatively fit with adjacent blades for alignment of cutting edges to form a straight knife edge, said blades being flat and each provided with a leading and a trailing end flange of reduced thickness, the flanges of adjacent blades lapping to produce plane orbital surfaces, and said pivotal connections each comprising a transverse pin in a blade flange and a transverse opening in the lapping flange of the adjacent blade, said pin cooperating with said opening for articulation of the two blades in the orbital plane.

HARRY COHEN.